(12) United States Patent
Dry

(10) Patent No.: US 6,273,934 B1
(45) Date of Patent: Aug. 14, 2001

(54) METHOD AND AN APPARATUS FOR PRODUCING METALS AND METAL ALLOYS

(75) Inventor: Rodney James Dry, City Beach (AU)

(73) Assignee: Technological Resouces Pty. Ltd., Melbourne (AU)

(*) Notice: Subject to any disclaimer, the term of this patent is extended or adjusted under 35 U.S.C. 154(b) by 0 days.

(21) Appl. No.: 09/269,981

(22) PCT Filed: Sep. 17, 1997

(86) PCT No.: PCT/AU97/00611
§ 371 Date: Jul. 13, 1999
§ 102(e) Date: Jul. 13, 1999

(87) PCT Pub. No.: WO98/15662
PCT Pub. Date: Apr. 16, 1998

(30) Foreign Application Priority Data
Oct. 7, 1996 (AU) .................................. PO 2764

(51) Int. Cl.⁷ ..................................... C21B 11/00
(52) U.S. Cl. ................... 75/500; 75/446; 75/491; 266/156; 266/160
(58) Field of Search .............. 423/439; 266/160, 266/156; 75/500, 446, 491, 492, 501, 502

(56) References Cited

U.S. PATENT DOCUMENTS

| | | |
|---|---|---|
| 3,936,296 | 2/1976 | Campbell . |
| 3,985,544 | 10/1976 | Collin . |
| 4,094,665 | 6/1978 | Collin . |
| 4,098,604 | 7/1978 | Collin . |
| 4,490,168 | 12/1984 | Formanek et al. . |
| 4,756,748 | 7/1988 | Lu et al. . |
| 4,806,158 | 2/1989 | Hirsch et al. . |
| 4,880,458 | 11/1989 | Martinez-Vera et al. . |
| 4,946,498 | 8/1990 | Weber . |
| 5,069,716 | 12/1991 | Dam G. et al. . |
| 5,226,951 | 7/1993 | Kepplinger et al. . |
| 5,228,901 | 7/1993 | Taylor et al. . |
| 5,433,767 | 7/1995 | Bresser et al. . |
| 5,869,018 | * 2/1999 | Stephens, Jr. ........... 423/439 |

FOREIGN PATENT DOCUMENTS

| | | |
|---|---|---|
| 649402 | 5/1994 | (AU) . |
| 0 184 405 | 6/1986 | (EP) . |
| 0 209 149 | 1/1987 | (EP) . |
| 1143527 | 2/1969 | (GB) . |
| 2 188 066 | 9/1987 | (GB) . |
| 52-105517 | 9/1977 | (JP) . |
| 06-271919 | 9/1994 | (JP) . |
| WO 89/08724 | 9/1989 | (WO) . |
| WO 90/07010 | 6/1990 | (WO) . |
| WO 93/06251 | 4/1993 | (WO) . |
| WO 96/31627 | 10/1996 | (WO) . |
| WO 97/17473 | 5/1997 | (WO) . |

* cited by examiner

*Primary Examiner*—Melvyn Andrews
(74) *Attorney, Agent, or Firm*—Merchant & Gould P.C.

(57) ABSTRACT

A method of producing metals and metal alloys from metal oxides is disclosed. The method comprises the steps of partially pre-reducing the metal oxides to a pre-reduction degree of at least 60% in one or more pre-reduction stages. Thereafter, the method comprises completely reducing the metal oxides and melting the metal in a smelt reduction stage. The method is further characterized by carrying out at least one of the pre-reduction stages with one or more of natural gas, reformed natural gas, and partially reformed natural gas as a source of reductant.

8 Claims, 1 Drawing Sheet

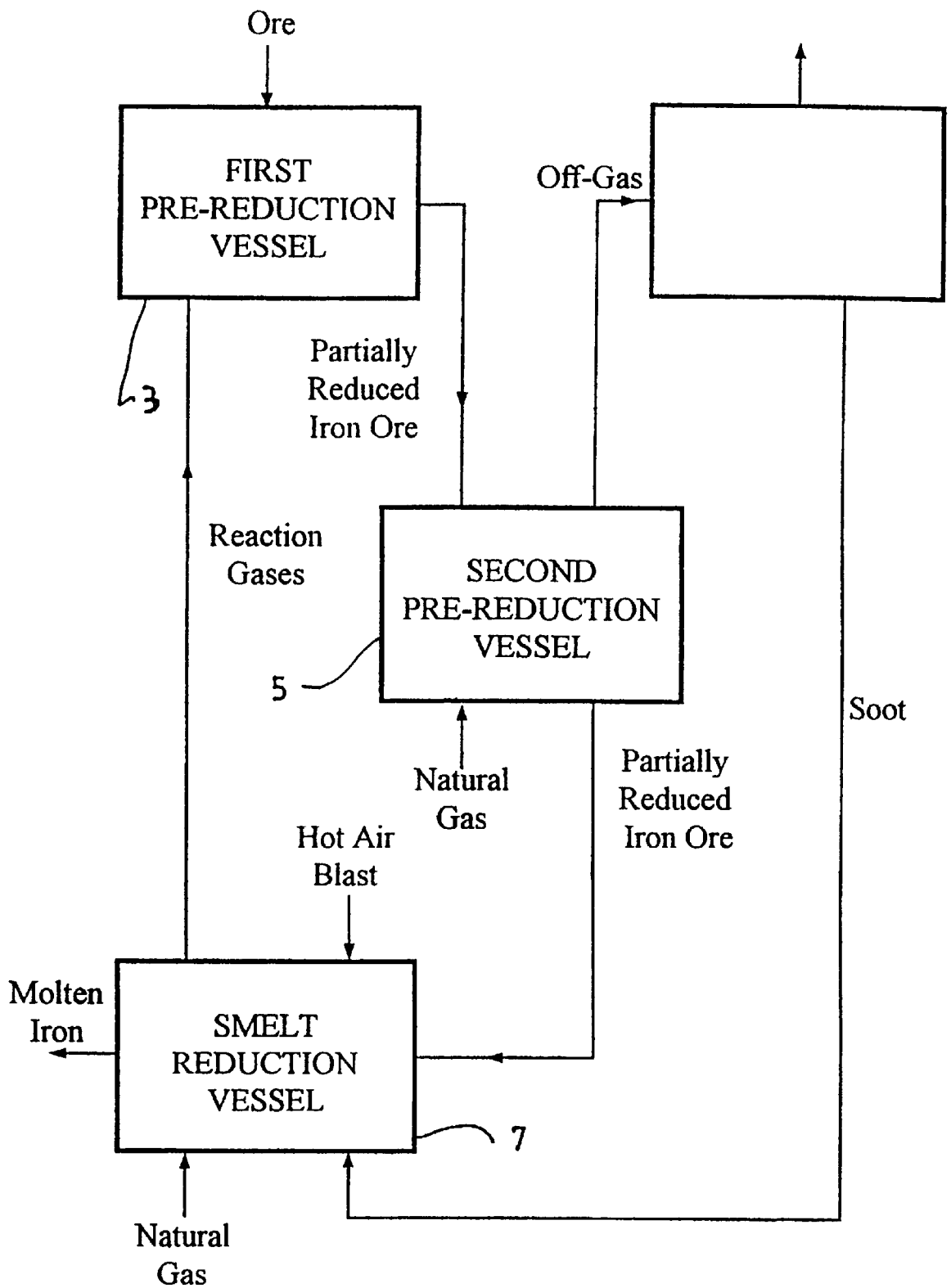

METHOD AND AN APPARATUS FOR PRODUCING METALS AND METAL ALLOYS

FIELD OF THE INVENTION

The present invention relates to a method and an apparatus for producing metals and metal alloys, in particular although by no means exclusively iron and iron alloys, from metal oxides, such as ores and partly reduced ores, which is based on the use of a metallurgical vessel containing a molten bath.

BACKGROUND OF THE INVENTION

There are a number of known methods of smelting iron ore and partly reduced iron ore which are based on the use of a metallurgical vessel (often referred to as a "smelt reduction vessel") containing a molten bath of iron and slag.

In general terms, these known methods require that a carbonaceous material be injected into the molten bath as a source of reductant and thermal energy. The carbonaceous material may be in solid form, such as coal, or in gaseous form, such as natural gas.

Australian patent 649,402 entitled "Smelting of Pre-reduced Iron Oxide" in the name of Zurich Branch of Midrex International BV Rotterdam discloses one particular method of smelting iron ore and partly reduced iron ore which is based on the injection of natural gas into a molten bath in a metallurgical vessel.

SUMMARY OF THE INVENTION

An object of the present invention is to provide a more effective method of smelting iron ore and partly reduced iron ore than that disclosed in Australian patent 649,402.

According to the present invention there is provided a method of producing metals and metal alloys from metal oxides, which method comprises the steps of partially pre-reducing the metal oxides to a pre-reduction degree of at least 60% in one or more pre-reduction stages and, thereafter, completely reducing the metal oxides and melting the metal in a smelt reduction stage, and which method is characterised by carrying out at least one of the pre-reduction stages with one or more of natural gas, reformed natural gas, and partially reformed natural gas as a source of reductant.

The present invention is based in part on the realization that the use of one or more of natural gas, reformed natural gas, and partially reformed natural gas in a pre-reduction stage of a method of smelting iron ore or partly reduced iron ore enables more effective and efficient use of natural gas than in the method disclosed in Australian patent 649,402 which is based only on the use of natural gas in the smelt reduction stage of the method.

It is preferred that the pre-reduction stage(s) pre-reduce the metal oxides to a pre-reduction degree of at least 70%.

It is preferred particularly that the pre-reduction stage(s) pre-reduce the metal oxides to a pre-reduction degree of at least 80%.

It is preferred more particularly that the pre-reduction stage(s) pre-reduce the metal oxides to a pre-reduction degree of at least 90%.

It is preferred that an excess of one or more of natural gas, reformed natural gas, and partially reformed natural gas be supplied in the or each pre-reduction stage to produce a solid carbonaceous product, typically soot, and/or a solid carbon-containing product, such as iron carbide.

It is preferred particularly that the solid carbonaceous product and/or solid carbon-containing product be supplied to the smelt reduction stage.

It is preferred that the smelt reduction stage be carried out in a metallurgical vessel comprising a molten bath containing metal and slag.

It is preferred particularly that the molten bath comprise a metal layer and a slag layer.

It is preferred that the metallurgical vessel be a smelt reduction vessel which comprises bottom and/or side tuyeres/lances and/or top tuyeres/lances and that the method comprises injecting a solid and/or a gaseous carbonaceous material into the molten bath via the tuyeres/lances.

It is preferred that the solid carbonaceous material injected into the molten bath be the solid carbonaceous product and/or the solid carbon-containing product from the natural gas-operated pre-reduction stage(s).

It is preferred that the gaseous carbonaceous material be natural gas.

It is preferred particularly that the smelt reduction vessel comprises:

(i) one or more tuyeres/lances for injecting the partially reduced metal oxides from the pre-reduction stages into the molten bath; and (ii) one or more tuyeres/lances for injecting a gas that contains oxygen into the space above the surface of the molten bath to after-burn or post-combust reaction gases, such as CO and $H_2$, released from the molten bath.

It is preferred particularly that air be the oxygen-containing gas injected into the smelt reduction vessel in step ii.

It is preferred more particularly that the air be preheated to a temperature of at least 1000° C.

It is preferred that there be two pre-reduction stages.

In such a situation it is preferred particularly that the first pre-reduction stage pre-reduce the metal oxides to a pre-reduction degree of at least 11%, and the second pre-reduction stage pre-reduce the partly reduced metal oxides from the first pre-reduction stage to the selected pre-reduction degree.

It is preferred that off-gas that is discharged from the smelt reduction vessel be the source of reductant in the first pre-reduction stage.

Alternatively, it is preferred that off-gas from the second pre-reduction stage be the source of reductant in the first pre-reduction stage.

It is preferred that one or more of natural gas, reformed natural gas, and partially reformed natural gas be the source of reductant in the second pre-reduction stage.

The metal oxides may be in any suitable form. For example, the metal oxides may be in the form of ores, and the ores may be in the form of lump or fines.

It in preferred that the metal oxides be iron oxides.

According to the present invention there is also provided an apparatus for producing metals and metal alloys from metal oxides which comprises:

(i) one or more pre-reduction vessels for carrying out pre-reduction of metal oxides in at least two stages to produce pre-reduced metal oxides having a pre-reduction degree of at least 60%, preferably at least 70%, more preferably at least 80%, and typically at least 90%, with at least one of the pre-reduction vessels comprising a means for injecting one or more of natural gas, reformed natural gas, and partially reformed natural gas into the vessel for use as a source of reductant; and (ii) a metallurgical vessel for completely reducing the partly reduced metal oxides and thereafter melting the metal, and the metallurgical vessel being adapted to contain a molten bath of metal and slag.

BRIEF DESCRIPTION OF THE DRAWING

The present invention is described further by way of example with reference to the accompanying drawing which is a flowsheet, in largely schematic form, of a preferred embodiment of the method and the apparatus of the present invention.

DETAILED DESCRIPTION OF THE INVENTION

The description of the preferred embodiment is in the context of producing iron from iron ore. However, it is noted that the preferred embodiment is equally applicable to producing metals from other metal oxides.

With reference to the flowsheet, in accordance with the preferred embodiment:

(i) iron ore is partially reduced in two successive stages in first and second pre-reduction vessels 3, 5 to a selected pre-reduction degree, and thereafter;

(ii) the partially reduced iron ore is completely reduced and melted in a smelt reduction vessel 7.

The iron ore may be in any suitable form, such as lump or fines.

The pre-reduction vessels 3, 5 may be of any suitable type, such as shaft furnaces or fluidised beds.

The source of reductant for the first pre-reduction vessel 3 comprises the reaction gases from the smelt reduction vessel 7.

The operating parameters of the first pre-reduction vessel 3 are selected to pre-reduce iron ore to an initial, relatively low pre-reduction degree, typically of the order of at least 11%.

The source of reductant for the second pre-reduction vessel 5 comprises natural gas.

In the second pre-reduction vessel 5, the natural gas is cracked to form the reductants carbon monoxide and hydrogen.

The operating parameters of the second pre-reduction vessel 5 are selected to further pre-reduce the partially reduced iron oxides from the first pre-reduction vessel 3 to the selected pre-reduction degree, typically of the order of at least 90%.

In accordance with a particularly preferred embodiment, an excess of natural gas is supplied to the second pre-reduction vessel 5 and the excess natural gas promotes reaction of carbon monoxide to form soot and carbon dioxide. The soot is discharged with off-gases from the second pre-reduction vessel 5 and, after separation from the off-gases, is transferred to the smelt reduction vessel 7 to carburise the iron in the molten bath and to act as a source of reductant and fuel.

The smelt reduction vessel 7 may be any suitable form of vessel.

The preferred smelt reduction vessel 7 is constructed to hold a molten bath of iron and slag and comprises:

(i) bottom or side tuyeres/lances for injecting solid and/or gaseous carbonaceous material into the molten bath to carburise the iron in the molten bath and to act as a source of reductant and thermal energy;

(ii) top tuyeres/lances for injecting the partially reduced iron ore from the pre-reduction vessel 5 into the molten bath from above the surface of the molten bath; and (iii) top tuyeres/lances for injecting a blast of hot air, typically at a temperature greater than 1000° C., into the space above the surface of the molten bath to post-combust reaction gases, such as carbon monoxide and hydrogen, released from the molten bath.

The configuration of the smelt reduction vessel 7, including the positioning of the tuyeres/lances, and the operating parameters of the method are selected to form a transition zone in the space above the molten bath surface in which there are ascending and thereafter descending droplets or splashes of molten metal and slag which mix with reaction gases from the molten bath, top blown hot air, and the reaction gases from post-combustion.

The purpose of the transition zone is to facilitate the efficient transfer to the molten bath of heat that is released by post-combustion reaction gases from the molten bath.

The transition zone may be formed by any suitable means.

For example, the transition zone may be formed by injecting a suitable gas, such as an inert gas through the bottom of the smelt reduction vessel 7 to cause eruption of droplets or splashes of molten metal and slag from the molten bath into the space above the molten bath surface.

Alternatively, the transition zone may be formed by controlled injection of a carrier gas and the partially reduced iron ore and/or other suitable solid materials, such as fluxes and/or slag forming agents, into the molten bath through a section of the side of the smelt reduction vessel 7 that contacts the molten bath and/or from above the surface of the molten bath.

The above-referenced preferred embodiment has a number of important features, including the following features.

1. In many areas, natural gas is readily available and inexpensive and, in these areas, a method of producing iron from iron ore that includes the use of natural gas has economic advantages.

2. The selection of relatively high levels of pre-reduction of iron ore in the pre-reduction vessels 3, 5 minimises the amount of reduction that is required in the smelt reduction vessel 7 to levels where it becomes viable to use natural gas in the smelt reduction vessel 7. This comment is made in the context that large volumes of natural gas, that would be required to achieve relatively high levels of reduction in the smelt reduction vessel 7, would cause the smelt reduction vessel 7 to operate at relatively low productivity.

Many modifications may be made to the preferred embodiment of the method and the apparatus described above with reference to the figure without departing from the spirit and scope of the invention.

For example, whilst the preferred embodiment comprises the use of two pre-reduction vessels 3, 5 it can readily be appreciated that the invention is not restricted to this arrangement and extends to the use of one, three or more pre-reduction vessels.

Furthermore, whilst the source of the second pre-reduction vessel 5 in the preferred embodiment comprises natural gas, it can readily be appreciated that the invention is not so limited and extends to the use of natural gas, reformed natural gas, and partially reformed natural gas.

Furthermore, whilst the preferred embodiment comprises supplying an excess of natural gas to form soot, it can readily be appreciated that the invention is not so limited and extends to forming any other solid carbonaceous product and/or a solid carbon-containing product, such as iron carbide.

Furthermore whilst the preferred embodiment comprises discharging soot from the second pre-reduction vessel 5 with off-gas from that vessel and separating the soot from the off-gas, and thereafter supplying the soot to the smelt reduction vessel 7, it can readily be appreciated that the invention is not so limited and extends to other arrangements. By way of example, the soot (or any other solid carbonaceous product or any solid carbon-containing product) formed in the second pre-reduction vessel 5 may be supplied directly to the smelt reduction vessel 7 with the partially reduced iron ore.

What is claimed is:

1. A method of producing iron and iron-containing alloys from iron oxides comprising:
   (i) partially pre-reducing iron oxides to a pre-reduction degree of at least 11% in a first pre-reduction vessel using off gas that is produced in a smelt reduction vessel as a source of reductant;
   (ii) pre-reducing the partially reduced iron oxides from the first pre-reduction stage to at least 60% in a second pre-reduction vessel using one or more of natural gas, reformed natural gas, and partially reformed natural gas as a source of reductant; and
   (iii) transferring the pre-reduced iron oxides to the smelt reduction vessel containing a molten bath of iron and slag and completely reducing the iron oxides and producing molten iron.

2. The method defined in claim 1 wherein the iron oxides are pre-reduced in the second pre-reduction vessel to a pre-reduction degree of at least 70%.

3. The method defined in claim 2 wherein the pre-reduction degree is at least 80%.

4. The method defined in claim 3 wherein the pre-reduction degree is at least 90%.

5. The method defined in claim 1 comprising supplying an excess of one or more of natural gas, reformed natural gas, or partially reformed natural gas to the first and/or second pre-reduction vessel to produce a solid carbonaceous product and/or a solid carbon-containing product, and supplying the solid carbonaceous product and/or solid carbon-containing product to the smelt reduction vessel.

6. The method defined in claim 1, wherein the smelt reduction vessel comprises bottom and/or side tuyeres/lances and/or top tuyeres/lances, and the method comprises injecting a solid and/or a gaseous carbonaceous material into the molten bath via the tuyeres/lances.

7. The method defined in claim 1, wherein the second pre-reduction vessel produces off-gas, and further comprising supplying at least a portion of the off-gas that is produced in the second pre-reduction vessel as a source of reductant in the first pre-reduction vessel.

8. A system for producing iron and iron-containing alloys from iron oxides which comprises:
   a first pre-reduction vessel for carrying out pre-reduction of the iron oxides to a pre-reduction degree of at least 11%;
   a second pre-reduction vessel connected to said first pre-reduction vessel and receiving therefrom the partially reduced iron oxides, said second pre-reduction vessel designed to pre-reduce the partially reduced iron oxides to a pre-reduction degree of at least 60%;
   a feed line connected to said second pre-reduction vessel for feeding one or more of natural gas, reformed natural gas, and partially reformed natural gas to said second pre-reduction vessel; and
   a metallurgical vessel connected to said second pre-reduction vessel for receiving the partly reduced iron oxides from said second pre-reduction vessel and melting and reducing the partly reduced iron oxides to molten iron, said metallurgical vessel including a feed line connected to said first pre-reduction vessel for feeding off gas from said metallurgical vessel to said first pre-reduction vessel.

* * * * *